United States Patent Office 3,639,368
Patented Feb. 1, 1972

3,639,368
CATALYSTS FOR POLYMERIZING OLEFINS
Jean Teitgen, Arthez-de-Bearn, and Philippe Mornet, Pau, France, assignors to Societe Nationale des Petroles d'Aquitaine, Tour d'Aquitaine, Courbevoie, France
No Drawing. Filed June 20, 1968, Ser. No. 738,408
Claims priority, application France, June 20, 1967, 111,091
Int. Cl. C08f 1/56, 15/04
U.S. Cl. 260—88.2                                                 13 Claims

ABSTRACT OF THE DISCLOSURE

An activator for catalytic systems which comprise an organo-metalic compound of a metal belonging to any of Groups I to III of the Periodic System and a compound of a transition metal and which are used for the polymerisation of olefins, consists of a halogenated derivative of 5,8-dioxo-Δ 1,4-methylene-hexahydronaphthalene, containing at least 4 halogen atoms in the molecule.

---

The invention relates to an improvement in catalysts for polymerising olefines, and more especially to the systems of the type known under the name of Ziegler catalysts. It comprises a new and improved catalytic system, and also the process for polymerising olefines which uses this system. The invention also covers a new group of activators of the Ziegler catalysts.

The polymerisation or copolymerisation of olefines is normally carried out at the present time in the presence of systems which comprise an organometallic compound of a metal of the Groups I to III of the Periodic System and a compound of a transition metal. The organometallic compound is usually an aluminium alkyl or haloaluminum alkyl, while the transition metals (Groups IV–B and V–B) which are most employed are titanium and vanadium, generally in the form of halides or oxyhalides. The activity of these catalytic systems falls as a function of time in proportion as the compound of the transition metal is reduced by the organoaluminium. In order to overcome this disadvantage, various activators have been proposed, and at the present time there are known several substances of which the addition to the Ziegler catalytic systems enables the period of activity of such systems to be lengthened. Such activators are, for example, organic azoxy compounds, unsaturated hydrocarbons, cyclic halogens or quinones. Thus, good results have been obtained in the polymerisation of olefins, more especially in the copolymerisation of ethylene with propylene, and in addition with a diene, by the introduction of hexachlorocyclopentadiene or even of benzoquinone into the polymerisation medium.

The improvement provided by the present invention consists in the use of certain new activators, the addition of which enables the activity of the Ziegler catalyst system to be increased much more than is the case with the known activators. In particular, with the adjuvants according to the invention, it is possible to achieve efficiencies (weight of polymer per unit of weight of the transition metal compound) which are decidedly higher, for example by 10 to 100%, than those which are provided by the activators of the prior art as referred to above.

The activators according to the invention are polyhalogenated derivatives of optionally substituted 5,8-dioxo-Δ 1,4-methylene-hexahydronaphthalene.

These compounds contain at least 4 halogen atoms in the nucleus which does not carry oxygen and preferably 6 to 8 halogen atoms for the entire molecule.

The 5,8-dioxo-Δ 1,4-methylene-hexahydronaphthalene from which the activators according to the invention are derived corresponds to the formula:

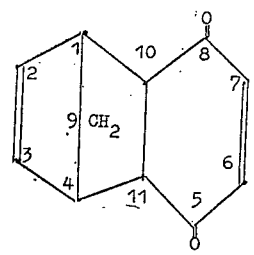

(1)

In an activator according to the invention, at least 4 of the 6 hydrogen atoms in the 1 to 4 and 9 positions of the Compound 1 are substituted by halogens, more especially chlorine and/or bromine. One or more of the other hydrogen atoms of the molecule, in the 6, 7, 9, 10 and 11 positions, can be replaced by radicals such as alkyl, alkoxy, cycloalkyl, aryl, aralkyl and/or alkaryl radicals, which are themselves optionally halogenated.

When these radicals are alkyls or cycloalkyls, it is preferable for their number of carbon atoms to be from 1 to 6, that is to say, these radicals should be such as, for example: methyl; mono-, di- or tri-chloro methyl; butyl; mono- to hexa-chloro (or bromo) butyl; hexyl; halogenated hexyl; cyclohexyl; mono- to hexachlorocyclohexyl, etc.

In the case of the aryl or alkaryl substituents, the number of carbon atoms of the substitution radical is especially from 6 to 10, its aryl portion being preferably formed by a substituted phenyl. Such radicals are, for example: mono- to penta-chloro- (or bromo-)phenyl; tolyl or halogenated tolyl; xylyl or halogenated xylyl; benzyl or halogenated benzyl, etc.

According to one preferred feature of the invention, the number of halogen atoms on the nucleus of the Compound 1 is 6 or from 6 to 8. Thus, remarkable results have been obtained in the copolymerisation of ethylene with propylene by using 1,2,3,4,9,9-hexachloro-5,8-dioxo-Δ1,4-methylene hexahydronaphthalene, that is to say, the substance derived from Compound 1 by all the hydrogen atoms in the 1,2,3,4 and 9-positions being replaced by chlorine. The same applies as regards the corresponding hexabrominated compound and mixed halogenated derivatives, of which some of the aforementioned positions are occupied by chlorine atoms and the others by bromine atoms.

Among other derivatives which are suitable as activators according to the invention, it is possible to mention, as non-limiting examples, the 5,8-dioxo-Δ1,4-methylene hexahydronaphthalenes which carry the substitutions:

1,2,3,4,9,9,10-heptachloro-
1,2,3,4,9,9,10,11-octachloro-
1,2,3,4,9,9-hexachloro-10,11-dibromo-
1,2,3,4,-tetrachloro-9,9-dimethoxy-
1,2,3,4,9,9-hexachloro-6-phenyl.

The activators according to the invention are preferably used in the quantity of 5 to 50 mols per gram atom of transition metal present in the catalyst system, or better still 10 to 20; this represents by weight a fairly small proportion in relation to the polymer to be prepared, since—as is known—the proportion of transition metal is generally very small.

In carrying out the invention, it is advisable to introduce the activator into the reaction medium with the commencement of the polymerisation.

When the catalyst system comprises a chlorinated aluminium alkyl and a vanadium compound, for example $VOCl_3$, the most favourable copolymerisation conditions for ethylene and propylene correspond to an atomic ratio Al/V of 20 to 50 and activator/V of 10 to 20. It is important that the quantity of chlorinated aluminium alkyl is always larger than that of the activator.

The invention is illustrated, but not limited, by the following examples, carried out in accordance with a like working method, the description of which follows.

WORKING METHOD OF THE EXAMPLES

The operations are carried out in a reactor having a capacity of 1 litre, provided with a condenser, a helical agitator, a thermometer tube, a tube for the introduction of gaseous monomers below the surface of the liquid, a dropping funnel for the activator in solution and a funnel provided for pouring the pre-mixed catalysts.

700 ml. of cyclohexane, purified with a gaseous mixture consisting of 33 mol percent of ethylene and 66 mol percent of propylene, both of which are very pure, are saturated for 20 minutes at atmospheric pressure. The total delivery is 100 litres/hour.

Without interrupting the introduction of the monomers, the pre-mixed primary catalyst, formed from $VOCl_3$ and aluminium ethyl sesquichloride ($Et_3Al_2Cl_3$) is added. The temperature is raised.

When no more absorption is observed, a few ml. of ethanol are added to destroy the active catalyst which possibly remains. The polymer is precipitated by means of an ethanol-acetone solution. The product is dried at 60° C. under vacuum until the weight is constant.

EXAMPLE 1

This is a comparison polymerisation without activator. The catalyst system comprises 0.1 millimole of $VOCl_3$ and 4 millimoles of $Et_3Al_2Cl_3$.

The absorption of the olefines ceases after 20 minutes. The weight of dry polymer collected is 6.3 g., this representing an efficiency of 350 (g. of polymer per g. of $VOCl_3$).

EXAMPLE 2

With the general conditions the same as in Example 1, the reaction medium has introduced thereinto dropwise, from the start of the polymerisation, 50 ml. of a solution of 1.2 millimoles of 1,2,3,4,9,9-hexachloro-5,8-dioxo-Δ1,4 methylene-hexahydronaphthalene in solution in benzene as activator.

The absorption of the olefines has then lasted 40 minutes instead of 20 minutes as in Example 1, and this means to say that the polymerisation has continued for 40 minutes. Throughout this time, the activator was added dropwise.

The molar ratio between activator and V was 12.

25.7 g. of polymer were collected, this corresponding to an efficiency of 1480, i.e. 4.2 times better than that of Example 1 without activator.

EXAMPLE 3

Operating as in Example 2, the activator according to the invention was replaced by 1.2 millimoles of benzoquinone.

After polymerising for 40 minutes, with dropwise introduction of this quinone in solution in benzene, 23.4 g. of polymer were obtained, this representing an efficiency of 1350.

EXAMPLE 4

Three polymerisation reactions are carried out, each with a catalyst system formed of 0.1 millimole of $VOCl_3$ and 5 millimoles of aluminium ethyl sesquichloride. In each case, 1 millimole of another activator is added. The results obtained are then as follows:

| Activator | Weight of polymer formed in grams | Efficiency Absolute | Efficiency Relative |
| --- | --- | --- | --- |
| Hexachlorocyclopentadiene (of the prior art) HCP | 13.1 | 760 | 1 |
| Benzoquinone (prior art) | 16.2 | 940 | 1.23 |
| Hexachloro-dioxomethylene Δ-hexahydronaphthalene of Example 2 (according to the invention) HDMH | 21.5 | 1,245 | 1.64 |

EXAMPLE 5

Comparative polymerisation reactions similar to those of Example 4 were carried out, each with 0.5 millimole of activator instead of 1 millimole. There were found:

| Activator | Weight of polymer, grams | Efficiency Absolute | Efficiency Relative |
| --- | --- | --- | --- |
| HCP | 10.7 | 620 | 1 |
| Benzoquinone | 12.9 | 745 | 1.2 |
| HDMH | 16.7 | 970 | 1.57 |

It can be seen that, in all cases, the activator according to the invention leads to efficiencies which are greatly increased by comparison with those which are given by the best activators according to the prior art. According to Examples 4 and 5, this increase with respect to hexachlorocyclopentadiene (HCP) is 64% and 57%, respectively; it can be calculated that it is 34% and 30% with respect to benzoquinone.

EXAMPLE 6

The reaction is carried out in a 5-litre reactor equipped with a condenser, a helical agitator, a thermometer tube, a tube for the addition of gaseous monomers below the surface of the liquid, a dropping funnel for introducing thereinto the activator in solution and dropping funnels provided for the dropwise introduction of the catalysts. 3.5 litres of purified cyclohexane are saturated at atmospheric pressure and at 17° C. with a mixture obtained from a delivery of ethylene of 21 litres per hour and a delivery of propylene of 32 litres per hour.

0.2 millimole of $VOCl_3$ is then introduced, followed by the dropwise addition, separately and for 20 minutes, of 9.6 millimoles of aluminium diethyl chloride and 1.9 millimoles of activator HDMH. The polymerisation is continued for another 40 minutes, this making a total period of 1 hour. During this time, the delivery of the monomer gases is kept at 57.5 l./h. for ethylene and 48.5 l./h. for propylene. There are obtained 60.5 g. of polymer (efficiency 1800) which is composed of 62% of ethylene and has a Mooney viscosity of about 60. Ash content 0.14%. The molecular weight, measured by viscosimetry, is 176,000.

What is claimed is:
1. A process which comprises interpolymerizing mixtures of ethylene and propylene in the presence of a catalyst system comprising
   (1) an aluminum alkyl,
   (2) a vanadium compound, and
   (3) as an activator, five to fifty moles per gram atom of vanadium metal of a halogenated derivative of 5, 8 - dioxo-Δ1,4-methylene-hexahydronaphthalene containing at least 4 halogen atoms on carbon atoms numbered 1 to 4 and 9 of the nucleus of the activator.

2. The process of claim 1 wherein the activator is 1,2, 3,4,9,9 - hexachloro - 5,8 - dioxo - Δ1,4 - methylene-hexahydronaphthalene.

3. The process of claim 1 wherein at least one of the positions on the nucleus of the activator numbered 6, 7, 9, 10 and 11 is substituted by a radical selected from the group consisting of alkyl, haloalkyl, alkoxy, haloalkoxy, aryl, haloaryl, cycloalkyl, halocycloalkyl aralkyl, haloaralkyl, and alkaryl.

4. The process of claim 1 wherein the vanadium compound is selected from the group consisting of halides and oxyhalides of vanadium.

5. The process of claim 4 wherein the atomic ratio Al:V is 20:1 to 50:1, and the ratio of moles of activator:gram atoms of vanadium is 10:1 to 20:1.

6. The process of claim 5 wherein the activator is 1,2,3,4,9,9 - hexachloro - 5,8 - dioxo - Δ1,4-methylene-hexahydronaphthalene.

7. The process of claim 1 wherein the activator contains 4 to 8 halogen atoms.

8. The process of claim 7 wherein the halogen atoms are chlorine or bromine.

9. The process of claim 8 wherein the halogen atoms are in 4 to 8 of the available positions on carbon atoms numbered 1 to 4 and 9 to 11 of the nucleus of the activator.

10. The process of claim 9 wherein the number of halogen atoms is 6 to 8.

11. A novel catalyst system for the polymerization of olefins comprising
(1) an aluminum alkyl;
(2) a vanadium compound; and
(3) as an activator, five to fifty moles per gram atom of vanadium metal of a halogenated derivative of 5,8 - dioxo-Δ1,4-methylene-hexahydronaphthalene containing at least 4 halogen atoms in the positions numbered 1 to 4 and 9 of the molecule.

12. The catalyst system of claim 11 wherein the activator is 1,2,3,4,9,9 - hexachloro-5,8-dioxo-Δ1,4-methylene-hexahydronaphthalene.

13. The catalyst system of claim 12 wherein the atomic ratio of Al:V is 20:1 to 50:1 and the ratio of moles of activator:gram atoms of vanadium is 10:1 to 20:1.

References Cited

UNITED STATES PATENTS 3,349,064  10/1967  Gumboldt et al. ----- 260—94.9
3,444,149  5/1969  Kelly -------------- 260—94.9

JOSEPH L. SCHOFER, Primary Examiner

E. J. SMITH, Assistant Examiner

U.S. Cl. X.R.

252—429 B; 260—80.78, 94.9 C